(12) United States Patent
Dey

(10) Patent No.: US 10,123,076 B2
(45) Date of Patent: *Nov. 6, 2018

(54) METHOD AND APPARATUS FOR PRESENTING MEDIA CONTENT

(71) Applicant: AT&T INTELLECTUAL PROPERTY I, L.P., Atlanta, GA (US)

(72) Inventor: Spondon Dey, Long Branch, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,483

(22) Filed: Jan. 19, 2017

(65) Prior Publication Data

US 2017/0134800 A1 May 11, 2017

Related U.S. Application Data

(63) Continuation of application No. 14/959,477, filed on Dec. 4, 2015, now Pat. No. 9,584,860, which is a (Continued)

(51) Int. Cl.
*H04N 21/443* (2011.01)
*H04N 21/61* (2011.01)
(Continued)

(52) U.S. Cl.
CPC ... *H04N 21/4436* (2013.01); *H04N 21/41407* (2013.01); *H04N 21/4402* (2013.01); *H04N 21/6131* (2013.01); *H04N 21/6181* (2013.01)

(58) Field of Classification Search
CPC ........ H04N 21/41407; H04N 21/6131; H04N 21/6137
See application file for complete search history.

(56) References Cited

U.S. PATENT DOCUMENTS 6,594,699 B1 7/2003 Sahai et al.
7,344,084 B2 3/2008 DaCosta
(Continued)

FOREIGN PATENT DOCUMENTS

WO WO2004031488 A1 * 4/2004
WO WO 2007117753 A2 * 10/2007 ....... H04L 29/06027

*Primary Examiner* — Ricky Chin
*Assistant Examiner* — Anthony Bantamoi
(74) *Attorney, Agent, or Firm* — Guntin & Gust, PLC; Ralph Trementozzi

(57) ABSTRACT

A system that incorporates teachings of the present disclosure may include, for example, a mobile communication device having a controller to receive a broadcast of media content from a first media source using a first communication protocol, display the media content on the mobile communication device, determine whether the media content exceeds one or more parameter thresholds when the media content is available to a display device from a second media source where the one or more parameter thresholds are based at least in part on the media content available from the second media source and where the display device is remote from the mobile communication device, and commence streaming of the media content from the mobile communication device to the display device when the media content exceeds the one or more parameter thresholds. Other embodiments are disclosed.

20 Claims, 5 Drawing Sheets

Related U.S. Application Data continuation of application No. 12/335,082, filed on Dec. 15, 2008, now Pat. No. 9,237,372.

(51) Int. Cl.
*H04N 21/414* (2011.01)
*H04N 21/4402* (2011.01)

(56) References Cited

U.S. PATENT DOCUMENTS

| | | |
|---|---|---|
| 7,603,022 B2 | 10/2009 | Putterman et al. |
| 7,916,166 B1 | 3/2011 | Habib et al. |
| 7,920,494 B2 | 4/2011 | Stewart |
| 2002/0022453 A1 | 2/2002 | Balog et al. |
| 2005/0110909 A1 | 5/2005 | Staunton et al. |
| 2005/0125819 A1 | 6/2005 | Ono et al. |
| 2006/0117371 A1 | 6/2006 | Margulis |
| 2006/0184994 A1 | 8/2006 | Eyer et al. |
| 2007/0067808 A1 | 3/2007 | Dacosta |
| 2007/0136768 A1 | 6/2007 | Kumar |
| 2007/0288970 A1 | 12/2007 | Tedenvall |
| 2008/0081640 A1 | 4/2008 | Tran |
| 2008/0130580 A1 | 6/2008 | Chaponniere et al. |
| 2008/0196072 A1 | 8/2008 | Chun |
| 2009/0061841 A1 | 3/2009 | Chaudri et al. |
| 2009/0193473 A1 | 7/2009 | Moon et al. |
| 2011/0247043 A1 | 10/2011 | Bar |

\* cited by examiner

100

400

METHOD AND APPARATUS FOR PRESENTING MEDIA CONTENT

CROSS-REFERENCE TO RELATED APPLICATION(S)

This application is a continuation of and claims priority to U.S. patent application Ser. No. 14/959,477 filed Dec. 4, 2015, which is a continuation of and claims priority to U.S. application Ser. No. 12/335,082 filed Dec. 15, 2008. The disclosures of which are hereby incorporated by reference in their entirety.

FIELD OF THE DISCLOSURE

The present disclosure relates generally to communication systems and more specifically to a method and apparatus for presenting media content.

BACKGROUND

Service providers often have various sources at their disposal for obtaining media content, including their own storage, an originating source, and third party providers. The available media content can be in various formats. Users often have various devices at their disposal for presenting media content, including TV's and hand held media devices.

DETAILED DESCRIPTION

Figure 1:
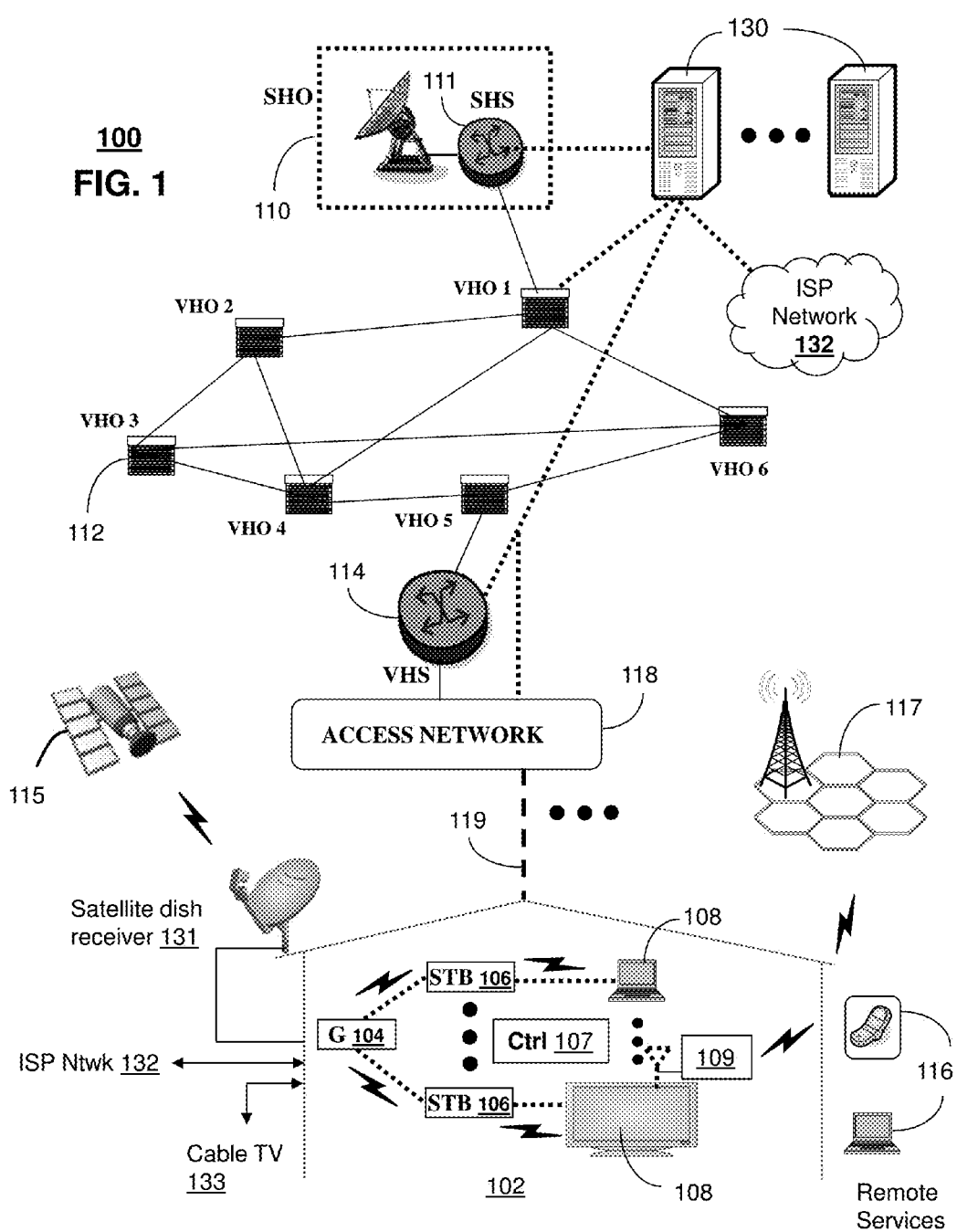
FIG. 1 depicts an illustrative embodiment of a communication system.

One embodiment of the present disclosure can entail a computer-readable storage medium of a mobile communication device where the storage medium includes computer instructions to establish a wireless communication link with a media source using a Single Carrier Frequency Division Multiple Access (SC-FDMA) scheme, receive a broadcast of media content from the media source using an Orthogonal Frequency Division Multiple Access (OFDMA) scheme, determine whether the media content is available to a display device from a set top box, determine whether the media content of the mobile communication device exceeds one or more parameter thresholds when the media content is available from the set top box where the one or more parameter thresholds are based at least in part on the media content available from the set top box and where the display device is remote from the mobile communication device, adjust a format of the media content of the mobile communication device for transmitting to the display device using a communication protocol different from the OFDMA scheme when the media content exceeds the one or more parameter thresholds, and commence streaming of the media content to the display device.

Another embodiment of the present disclosure can entail a mobile communication device including a controller to receive a broadcast of media content from a first media source using a first communication protocol, display the media content on the mobile communication device, determine whether the media content exceeds one or more parameter thresholds when the media content is available to a display device from a second media source where the one or more parameter thresholds are based at least in part on the media content available from the second media source and where the display device is remote from the mobile communication device, and commence streaming of the media content from the mobile communication device to the display device when the media content exceeds the one or more parameter thresholds.

Yet another embodiment of the present disclosure can entail a display device including a controller to determine whether media content that is broadcast and available from a mobile communication device exceeds one or more parameter thresholds where the one or more parameter thresholds are based at least in part on the media content that is available from a set top box and where the mobile communication device is remote from the display device, commence receiving the media content from the mobile communication device when the media content exceeds the one or more parameter thresholds, and display the received media content.

Yet another embodiment of the present disclosure can entail a set top box operably coupled to a display device. The set top box can include a controller to receive broadcast media content, and deliver the media content to the display device when the media content that is being streamed to the display device by a mobile communication device falls below one or more parameter thresholds, wherein the one or more parameter thresholds are based at least in part on the media content available from the set top box, wherein the mobile communication device is remote from the display device, and wherein the media content is delivered to the display device from a point where the media content fell below the one or more parameter thresholds.

Yet another embodiment of the present disclosure can entail a method including establishing a wireless communication link between a mobile communication device and a media source using a first communication protocol, at the mobile communication device receiving a broadcast of media content from the media source using the first communication protocol, determining whether the media content is available to a display device from a set top box, determining whether the media content of the mobile communication device exceeds one or more parameter thresholds when the media content is available from the set top box where the one or more parameter thresholds are based at least in part on the media content available from the set top box and where the display device is remote from the mobile communication device, and commencing streaming of the media content to the display device when the media content of the mobile communication device exceeds the one or more parameter thresholds.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In one embodiment, the display device 108 can be a TV having a controller 109 with a transceiver built therein for receiving media content directly from a mobile communication device 116. The media content can be in various forms, including video, video games, data, and so forth. The TV controller 109 and the device 116 can communicate using various protocols and techniques, including WiFi, WiMAX, Bluetooth and so forth. In one embodiment, the device 116 can detect or otherwise determine the communication and/or display capabilities of the TV 108 and can adjust the format of the media content accordingly. In another embodiment, the TV controller 109 and the mobile device 116 can be a multi-mode device and the mobile device can utilize a preferred mode of communication for transmitting the media content. In one embodiment, the mobile device 116 can receive the media content using Long Term Evolution (LTE) protocol, such as through use of a Single Carrier Frequency Division Multiple Access (SC-FDMA) uplink and Orthogonal Frequency Division Multiple Access (OFDMA) downlink with a base station transceiver. The LTE protocol can utilize discrete fourier transform signal processing to facilitate the communication with the mobile device 416.

In another embodiment, the LTE protocol can support multi-antenna techniques. For instance, multiple input and multiple output (MIMO), multiple input and single output (MISO), single input and single output (SISO), single input and multiple output (SIMO), network multiple input and multiple output (Net-MIMO) and/or multiple user multiple input and multiple output (MU-MIMO) can be employed for communication of the media content.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
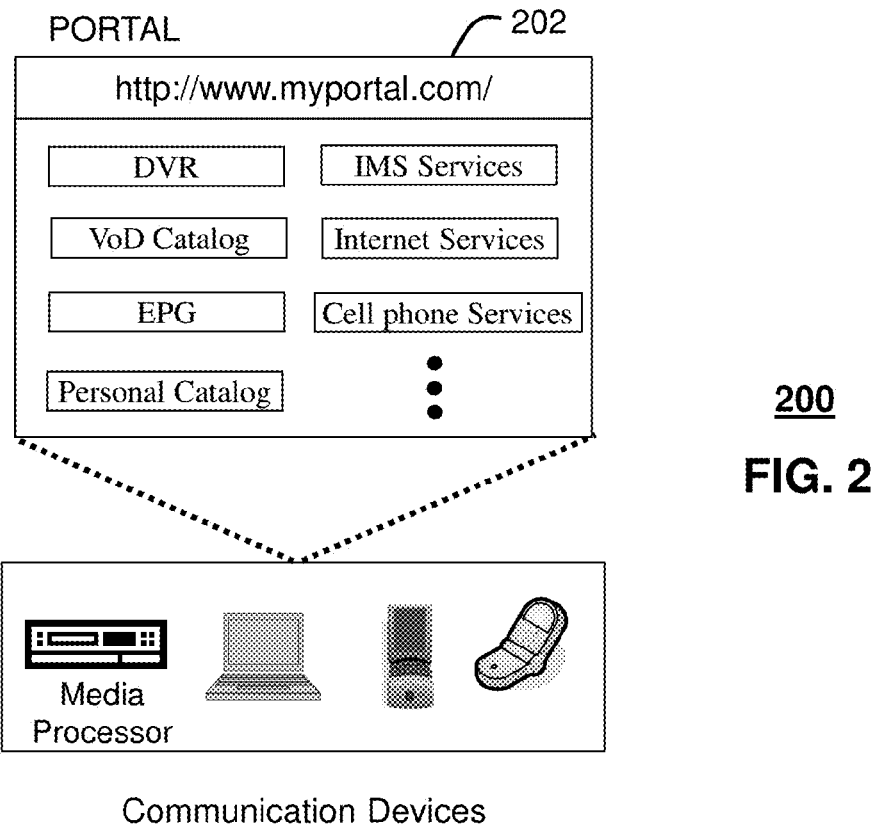
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
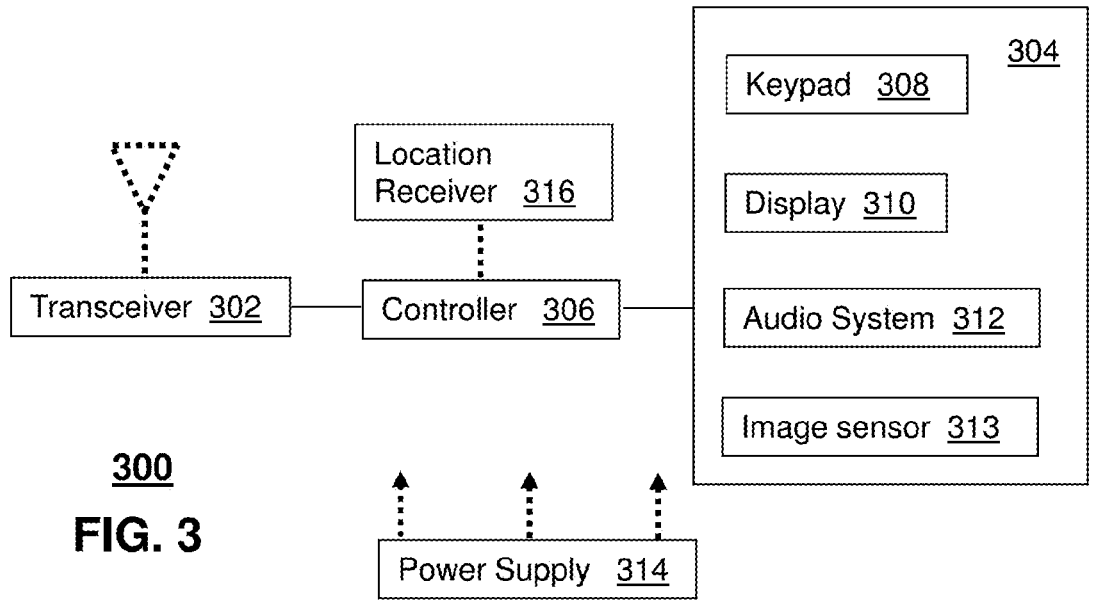
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
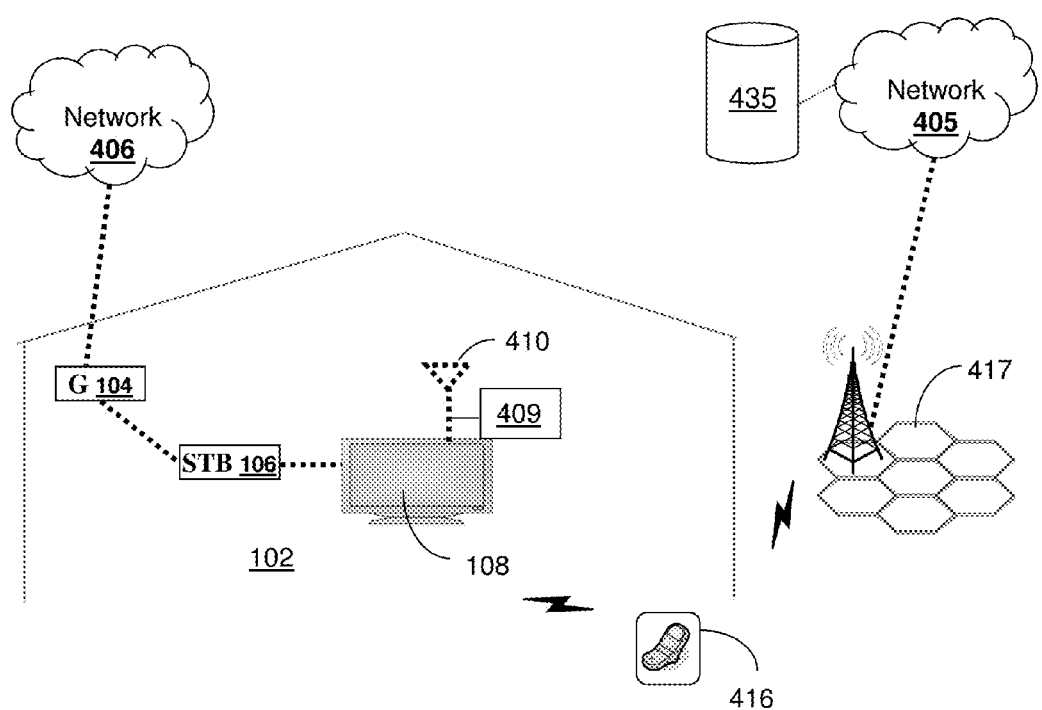
FIG. 4 depicts an illustrative embodiment of a communication system.

FIG. 4 depicts an exemplary embodiment of a communication system 400 for delivering media content. Communication system 400 can be overlaid or operably coupled with communication system 100 as another representative embodiment of said communication systems.

System 400 can include a user network, residence or other location 102 having a gateway 104, STB 106 and display device or TV 108. The STB 106 can be coupled to a media network 406, such as the IPTV network shown in FIG. 1 or one or more other media service provider networks including satellite, cable and so forth. The TV 108 can include a controller 409 incorporated into the TV and a transceiver 410 built therein for receiving media content from a hand held media device 416 having the ability to present the media content on its display device. In one embodiment, the transceiver 410 can be a multi-mode device capable of communicating using a number of protocols, including WiFi, Bluetooth, WiMax, OFDMA, SC-FDMA, LTE and so forth.

System 400 can utilize various protocols, techniques and combinations thereof for wirelessly broadcasting media content which is received by the hand held device 416 from a network 405 and towers 417, including LTE, WiMax, 3G, HSPA+ and so forth. The hand held device 416 can cache the media content upon receipt and then can begin streaming the media content from the cache in order to provide real time media content to the TV 108. System 400 can also utilize various protocols, techniques and combinations thereof for transmitting the requested media content to various points throughout the system, including use of an IPTV access network, the public Internet, and/or an IMS network. In one embodiment, the mobile device 416 and/or the controller 409 can selectively utilize communication protocols based on a number of factors including compatibility between the mobile device and the TV controller, signal quality or strength, type of media content, power consumption or efficiency and so forth.

A number of network devices, including DSLAM's, service routers and Ethernet switches, can be utilized for transporting the signals along and from the network 405 and/or 406, and can be provided in various areas of the provider network including intermediate offices, central offices and neighborhood offices. The network 405 and/or 406 can utilize a number of connection structures for providing a communication link with the communication devices, including twisted pair lines, fiber lines and/or wireless connections. In one embodiment, an IMS network can be coupled to or incorporated with a Universal Mobile Telecommunications System (UMTS) network, which can utilize various components, techniques and protocols for establishing wireless communication with the mobile device 416, such as W-CDMA. In one embodiment, the network 405 and the network 406 can be a single network that broadcasts the same media content to the STB 106 and the hand held device 416 using different protocols and different infrastructure but does so from the same media source.

In one embodiment, the hand held device 416 can have access to a database 435, which can be used for establishing and maintaining user profiles or other user information, including user storage. The user profiles can be associated with one or more users of the network 405 and/or 406, as well as their communication devices. The user profiles can include device identification data, device and/or user preferences, format capabilities, wireless mode capabilities, service plans, and so forth. In one embodiment, the user profiles can include monitored behavior and history of the user and/or user pre-selections, such as preferences inputted by the user in temporal proximity to a request to transmit media content to the TV 108.

In another embodiment, the user information or profiles can be imported in whole or in part from other sources, such as from a third party network, including previous service providers. In one embodiment, the user information or profiles can be a group storage for multiple users, such as users associated with a residence or a business entity, which has a plurality of individual user profiles associated with each of the users. While system 400 depicts the network 405 storing the user information or profiles in a centralized fashion in database 435, it should be understood by one of ordinary skill in the art that the present disclosure contemplates other configurations, including distributed configurations, being applied to system 400.

In one embodiment, the network 405 can provide for signal processing to be applied to the video content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference.

For example, the media content video data can be formatted using E-VSB or other multi-profiling formats with main and lower profile versions. The lower profile versions of the video stream can have a lower resolution but higher error correction data (such as Forward Error Correction data) in order to maintain a link with devices receiving a weak signal. In one embodiment, select one(s) of the profile versions can be provided to the mobile device 416 by the network 405 and/or by the mobile device to the TV 108 when there is a fault or potential fault determined during the broadcast and/or re-transmission. The fault monitoring can be performed by the network 405 or some other monitoring device, and/or can be performed by the receiving device(s) such as mobile device 416 and/or TV 108. The particular error correction technique utilized for the various profiles can vary and can include FEC, such as block coding, convolution coding, concatenate coding, turbo coding and so forth.

The exemplary embodiments can be performed by a single service provider or vendor, as well as through use of different service providers or vendors, including home and mobile services being different vendors where the service provider associated with the network 405 and/or 406 provides an agreed service coordination of benefit to the user.

Figure 5:
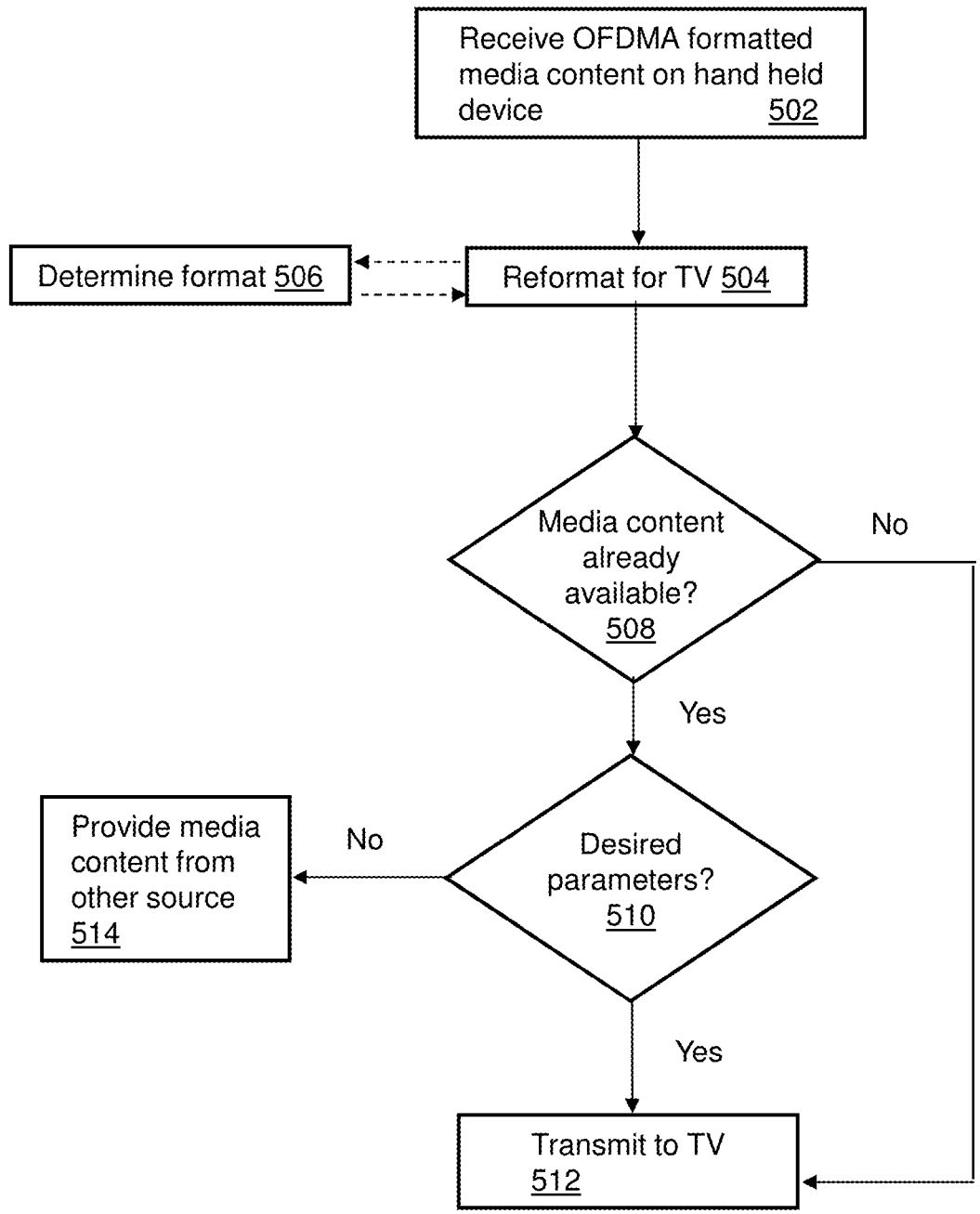
FIG. 5 depicts an illustrative embodiment of a method operating in portions of the communication systems of FIGS. 1 and 4.

FIG. 5 depicts an illustrative method 500 operating in portions of communication systems 100 and 400, including using mobile media device 416, TV controller 409 and STB 106 of system 400. Method 500 can begin with step 502 in which the mobile device 416 wirelessly receives broadcast media content using OFDMA protocol. The media content can be broadcast from the network 405 using LTE protocol, where the mobile device 416 establishes a wireless link utilizing SC-FMA protocol.

In step 504, the mobile device 416 can reformat the media content for transmission to the TV 108. In one embodiment, the reformatted media content can be cached upon reformatting. In another embodiment in step 506, a determination of the appropriate format for the media content can be made. For example, the mobile device 416 can be a multi-mode device that is capable of selecting a communication mode or protocol and transmitting the reformatted media content according to the selected protocol, such as Bluetooth, WiFi, and so forth. In one embodiment, the mobile device 416 can communicate with the TV 108 to obtain preferred protocols for transmitting the media content. In another embodiment, the determination of the preferred protocol can be based on a user profile associated with the TV 108 and/or the mobile device 416. For instance, the user profile can identify the preferred protocol or can identify criteria for determining the preferred protocol, such as based on time, power consumption, media content type, cost and so forth.

In step 508, the TV controller 409 and/or the mobile device 416 can determine if the media content is available from another source, such as the STB 106. The availability determination can be based on a number of techniques, including searching an Electronic Program Guide. If the media content is not available from another source then method 500 can advance to step 512 where the mobile device begins streaming of the media content to the TV 108, such as from a cache memory of the mobile device. If on the other hand, the media content is available from the STB 106 or other source then a determination as to whether the media content from the mobile device 416 has desired parameters can be made in step 510. The desired parameters can be a quality of the video content, power savings, adherence to Digital Rights Management requirements, cost savings (such as based on access and/or subscriber fees), and so forth. If the media content from the mobile device 416 has the desired parameters then it can be transmitted to the TV 108 for presentation in step 512 otherwise the TV 108 can obtain the media content from the other source in step 514.

In one embodiment, the other media source, such as the STB 106 can be utilized as a supplemental source for the streaming in the event that there is a link failure between the mobile device 416 and the TV 108 and/or the media content from the mobile device loses or otherwise no longer has the desired parameters. For example, the mobile device 416 can begin transmitting a broadcast movie to the TV 108 based on the quality of the video meeting a pre-determined threshold. The movie can be transmitted using E-VSB format with main and lower profiles. When a failure or otherwise undesired condition is detected then the lower profile version of the movie can be transmitted by the mobile device 416. If the lower profile version no longer meets the quality threshold then the TV 108 can begin obtaining the remaining portion of the movie from the STB 106. The media content being transmitted in system 400 can vary and can include video games and so forth.

In one embodiment, DRM policies can be applied to the transmission of the media content from the mobile device 416 to the TV 108. For instance, particular media content or media content from a particular source may only be permitted to be displayed on the mobile device 416. In this example, the DRM policy can be applied to the transmission of the media content and can prevent retransmission by the mobile device 416 to the TV 108.

In one embodiment, the user profiles can include monitored behavior data associated with the user and one or more of the user's communication devices, including the TV 108 and/or the mobile device 416. In one embodiment, parties that are not associated with a particular service provider but that participate in the transmission of the media content can have sub-profiles established within the user profile so that future retranmsissions involving such parties can be enhanced, such as through video/audio data format adjustments. For instance, if a mobile hand-held device 416 of a third party is being utilized for retransmitting broadcast media content to the TV 108 then a sub-profile for that party and his or her device can be established so that any future retransmissions can be facilitated (including storing communication capabilities for the device).

In one embodiment, the format adjustment by the mobile device 416 can be based on receipt of the media content using an OFDMA scheme. The media content can then be reformatted by the mobile device 416 for transmission to the TV 108 using a SC-FDMA. In this example, the mobile device is capable of communicating with the network 405

(such as the base station transceiver) using SC-FDMA and can further communicate with the TV transceiver using the SC-FDMA.

In another embodiment, the format adjustment can include adjusting the communication protocol in combination with or in place using multiple profile versions of the video content, such as through use of E-VSB. For example, the network 405 can transmit a video stream to the mobile device 416 with main and secondary profiles. In another embodiment, the mobile device 416 can receive the video stream containing main and secondary profiles, remove select profile versions, and transmit those select profile versions to the TV 108. In another embodiment, the mobile device 416 can receive the media content and generate the main and secondary profile versions for transmission to the TV 108. The amount of error correction and thus the resolution of the profile versions can be determined based on a number of factors, including user preferences in the user profiles and monitored network conditions, such as traffic or latency.

Upon reviewing the aforementioned embodiments, it would be evident to an artisan with ordinary skill in the art that said embodiments can be modified, reduced, or enhanced without departing from the scope and spirit of the claims described below. For example, the thresholds for transmitting the media content from the mobile device 416 rather than from another media source, such as the STB 106, can vary. In one embodiment, the mobile device 416 can determine power consumption that will result from the retransmission and compare the consumption with its own power levels. For instance, if a retransmission by the mobile device 416 to the TV 108 will result in the battery level falling below 10% then the mobile device may prevent the transmission or otherwise notify the user of this event. In this same example, the mobile device 416 can transmit a portion of the media content and allow the TV controller 409 to obtain the remaining portion from another media source, such as the STB 106.

Other suitable modifications can be applied to the present disclosure without departing from the scope of the claims below. Accordingly, the reader is directed to the claims section for a fuller understanding of the breadth and scope of the present disclosure.

Figure 6:
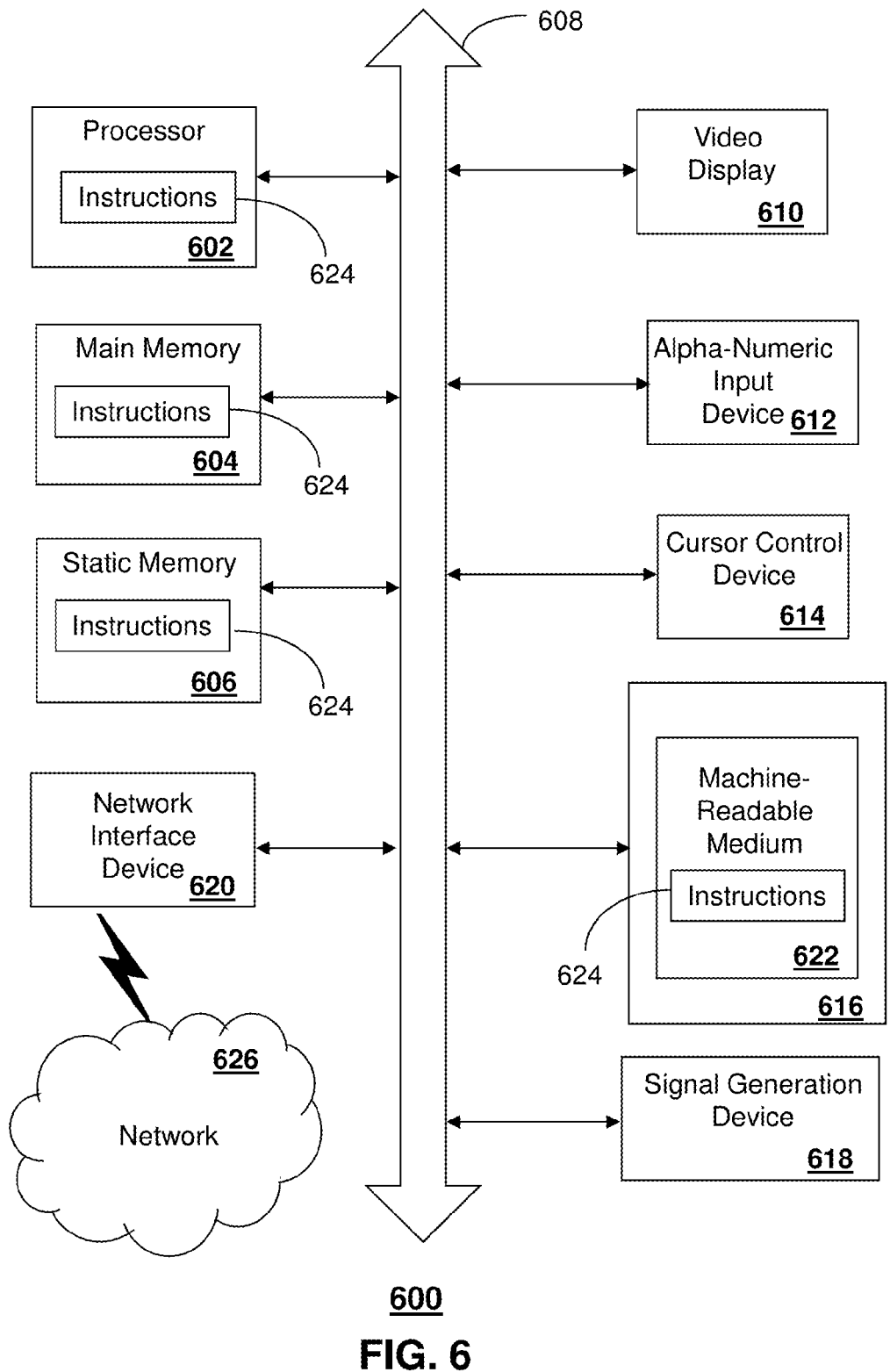
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device comprising:
a memory that stores executable instructions; and
a processing system comprising a processor communicatively coupled to the memory, wherein the processing system, responsive to executing the executable instructions, performs operations comprising:
receiving media content from a first media source;
determining whether the media content from a second media source is separately available to a television display device; and
responsive to the media content being separately available from the second media source to the television display device,
evaluating a power consumption according to a power consumption threshold, wherein the power consumption is based on a transmitting of the media content from the mobile communication device to the television display device;
evaluating a quality according to a minimum quality, wherein the quality is based on the transmitting of the media content from the mobile communication device to the television display device;
responsive to the power consumption exceeding the power consumption threshold and the quality satisfying the minimum quality, transmitting a stream of the media content to the television display device via a first wireless communication interface; and
responsive to one of the power consumption failing to exceed the power consumption threshold, the quality failing to satisfy the minimum quality, or both, allowing the television display device to receive the media content from the second media source.

2. The mobile communication device of claim 1, wherein the media content is transmitted using a first transmission protocol that is selected according to a power consumption criteria associated with a user profile.

3. The mobile communication device of claim 1, wherein the media content is received from the first media source via a wireless communication link to a cellular base station using long-term evolution protocol.

4. The mobile communication device of claim 1, wherein the operations further comprise: receiving first information from the television display device via the first wireless communication interface to the television display device, wherein the first information identifies a preferred media content communication protocol for the television display device; and selecting a first media content communication protocol from a plurality of media content communication protocols based on the preferred media content communication protocol.

5. The mobile communication device of claim 4, wherein the first media content communication protocol comprises enhanced-vestigial sideband modulation.

6. The mobile communication device of claim 4, wherein the first media content communication protocol comprises a single carrier frequency division multiple access scheme.

7. The mobile communication device of claim 1, wherein the operations further comprise: determining if the transmitting of the media content to the television display device is resulting in the power consumption exceeding the power consumption threshold; and stopping the transmitting of the media content to the television display device responsive to the determining that the power consumption is exceeding the power consumption threshold.

8. The mobile communication device of claim 7, wherein the television display device receives the media content from the second media source from a point in the media content where the mobile communication device stopped transmitting the media content to the television display device responsive to the determining that power consumption is exceeding the power consumption threshold.

9. The mobile communication device of claim 1, wherein the power consumption at the mobile communication device is determined by detecting a battery level at the mobile communication device.

10. The mobile communication device of claim 1, wherein the operations further comprise adjusting a format of the media content prior to transmitting the stream of the media content to the television display device.

11. The mobile communication device of claim 1, wherein the quality comprises a quality of a signal comprising the media content.

12. The mobile communication device of claim 1, wherein the media content comprises a video content, and wherein the quality comprises a quality of the video content.

13. A device, comprising:
a display; a memory that stores executable instructions; and
a processing system comprising a processor communicatively coupled to the display and the memory, wherein the processing system, responsive to executing the executable instructions, performs operations comprising:
determining availability of media content from a media source;
transmitting, via a first wireless communication interface and to a mobile communication device, first information associated with the availability of the media content from the media source;
receiving, via the first wireless communication interface and from the mobile communication device, a stream of the media content according to a first transmission protocol responsive to the first information indicating the media content is not available, if transmission of the media content according to the first transmission protocol would not result in power consumption at the mobile communication device exceeding a threshold and if the transmitting of the media content satisfies a minimum quality; and
receiving the media content from the media source responsive to the first information indicating the media content is not available, if transmission of the media content according to the first transmission protocol would result in power consumption at the mobile communication device exceeding a threshold and if the transmitting of the media content would not satisfy the minimum quality.

14. The device of claim 13, wherein the operations further comprise transmitting second information to the mobile communication device via the first wireless communication interface, wherein the first information identifies a preferred media content communication protocol for the display, and wherein the mobile communication device selects a first media content communication protocol from a plurality of media content communication protocols based on the preferred media content communication protocol.

15. The device of claim 13, wherein transmission of the stream of the media content is hafted by the mobile communication device responsive to determining that the power consumption at the mobile communication device is exceeding a threshold.

16. The device of claim 15, wherein the operations further comprise receiving the media content from the media source from a point in the media content where the mobile communication device stopped transmitting the stream of the media content responsive to the determining that power consumption is exceeding the threshold.

17. The device of claim 13, wherein the power consumption at the mobile communication device is determined by detecting a battery level at the mobile communication device.

18. A method, comprising:
determining, by a processing system including a processor and a display, availability of media content from a media source;
transmitting, by the processing system and to a mobile communication device, first information associated with the availability of the media content from the media source;
receiving, by the processing system, via a first wireless communication interface and from the mobile communication device, a stream of the media content according to a first transmission protocol responsive to the first information indicating the media content is not available, if transmission of the media content according to the first transmission protocol would not result in power consumption at the mobile communication device exceeding a threshold and if the transmitting of the media content satisfies a minimum quality; and
receiving, by the processing system, the media content from the media source responsive to the first information indicating the media content is not available, if transmission of the media content according to the first transmission protocol would result in power consumption at the mobile communication device exceeding a threshold and if the transmitting of the media content would not satisfy the minimum quality.

19. The method of claim 18, further comprising transmitting, by the processing system, second information to the mobile communication device, wherein the first information identifies a preferred media content communication protocol for the display, and wherein the mobile communication device selects a first media content communication protocol from a plurality of media content communication protocols based on the preferred media content communication protocol.

20. The method of claim 18, wherein transmission of the stream of the media content is halted by the mobile communication device responsive to determining that the power consumption at the mobile communication device is exceeding a threshold.

* * * * *

UNITED STATES PATENT AND TRADEMARK OFFICE
CERTIFICATE OF CORRECTION

PATENT NO. : 10,123,076 B2
APPLICATION NO. : 15/410483
DATED : November 6, 2018
INVENTOR(S) : Spondon Dey Page 1 of 1

It is certified that error appears in the above-identified patent and that said Letters Patent is hereby corrected as shown below:

In the Claims

Column 14, Line 6, "hafted" should be changed to --halted--.

Signed and Sealed this
Fifteenth Day of January, 2019

Andrei Iancu
*Director of the United States Patent and Trademark Office*